INVENTOR.
BILLIE LEE SQUIRRELL
BY
ATTORNEY.

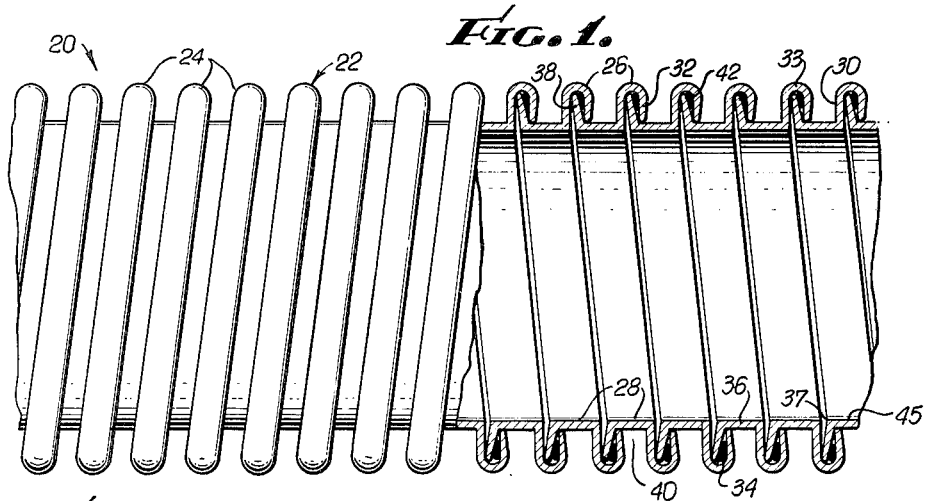
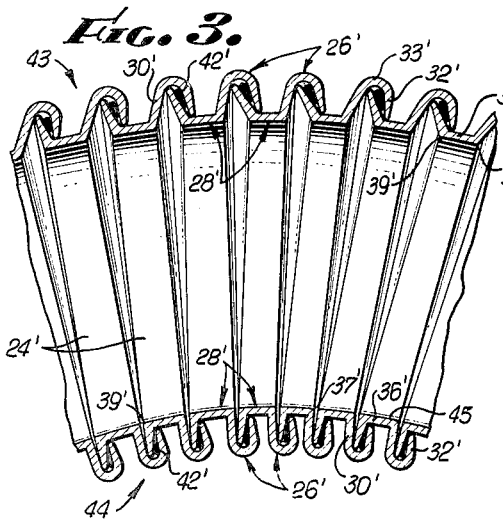
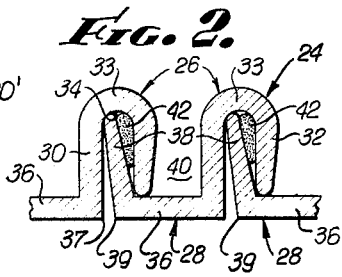
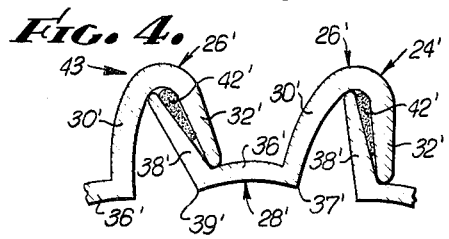
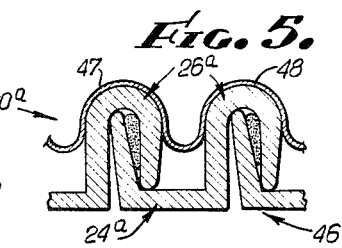
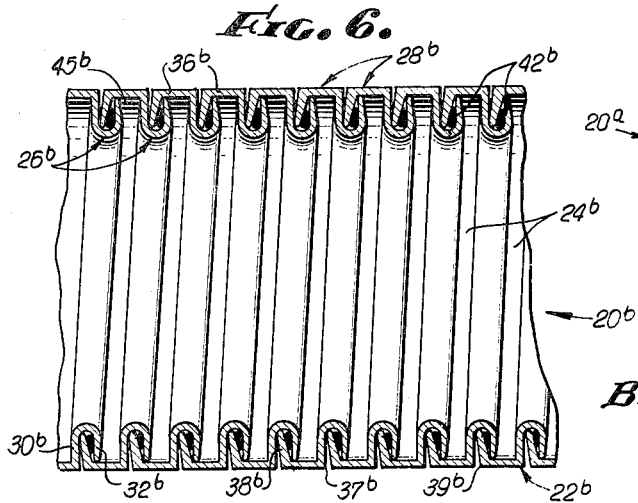
INVENTOR.
BILLIE LEE SQUIRRELL
BY Harry Kotler
ATTORNEY.

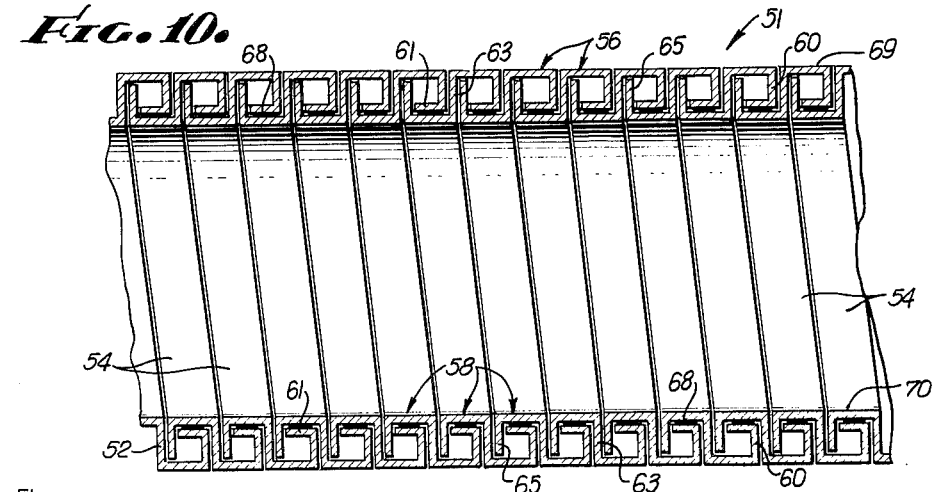
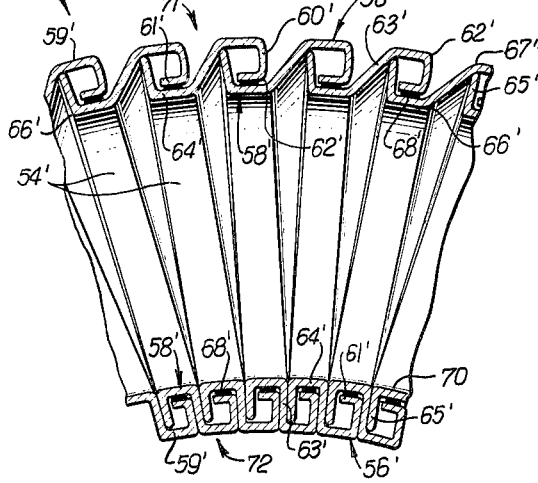
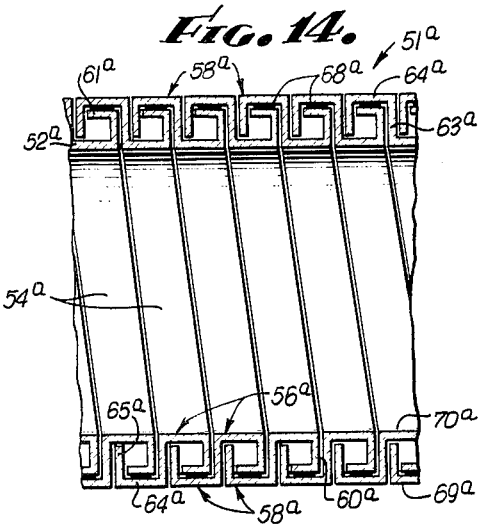
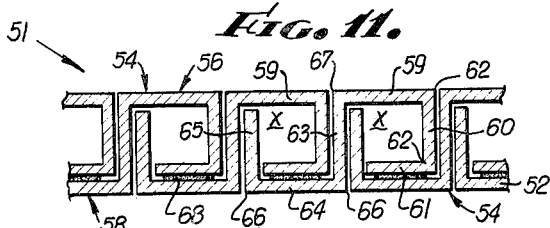
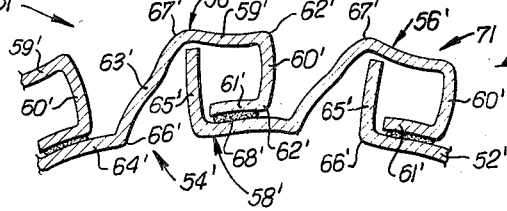
INVENTOR.
BILLIE LEE SQUIRRELL
BY
ATTORNEY.

June 14, 1966   B. L. SQUIRRELL   3,255,780
FLEXIBLE HOSE OF INTERLOCKING HELICAL CONVOLUTIONS
Filed Feb. 15, 1962   4 Sheets-Sheet 4
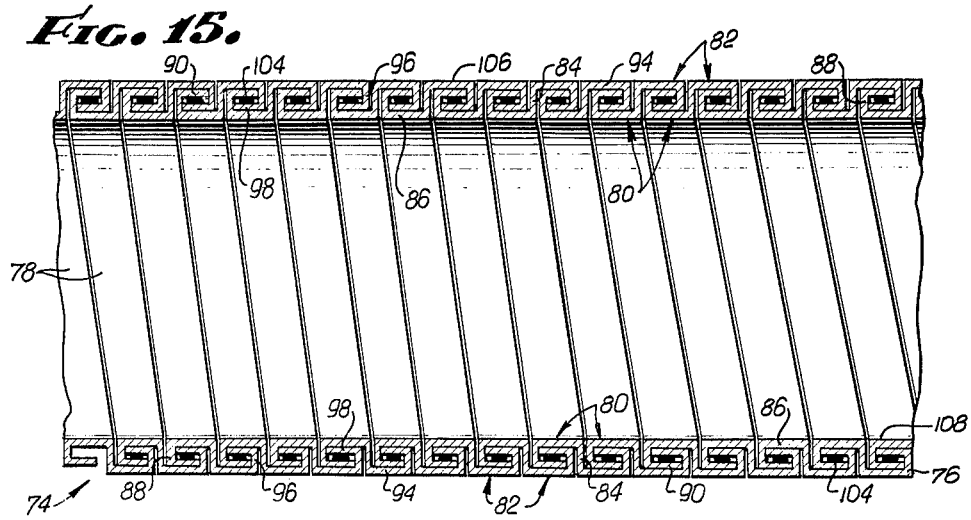
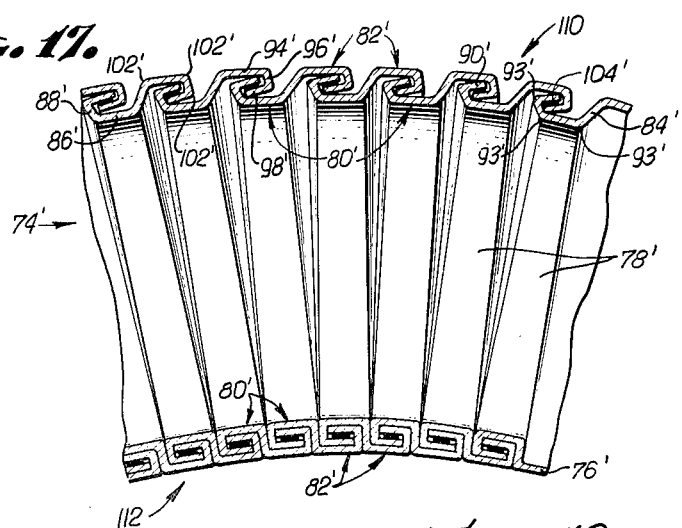
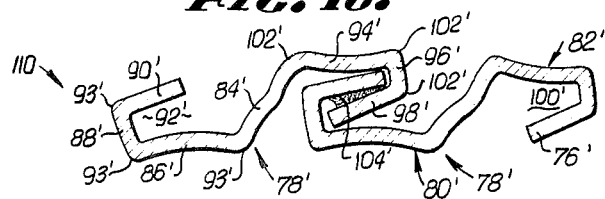
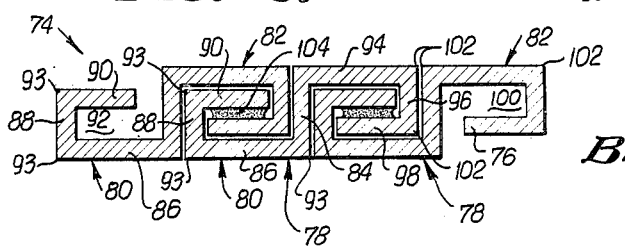
INVENTOR.
BILLIE LEE SQUIRRELL
BY
Harry Kotler
ATTORNEY.

United States Patent Office 3,255,780
Patented June 14, 1966

3,255,780
FLEXIBLE HOSE OF INTERLOCKING HELICAL CONVOLUTIONS
Billie Lee Squirrell, Los Angeles, Calif., assignor to Plastiflex Company, Venice, Calif., a corporation of California
Filed Feb. 15, 1962, Ser. No. 173,423
5 Claims. (Cl. 138—122)

The present application is a continuation-in-part of my copending application, Serial No. 69,695, filed November 11, 1960, now abandoned, for Flexible Hose Construction.

The present invention relates to flexible hose constructions, and more particularly to a flexible hose having interlocking helical convolutions.

Flexible hoses are well-known in the prior art, and may be constructed of metal or plastic material. In some cases, a metal or plastic hose core has been employed, covered with a plastic sheet material. The hose core has, for example, often been in the form of a strip of metal wound into a helix. Helically wound strips of metal have also been utilized alone as hoses (i.e., without an outer covering of flexible sheet material). These and other similar types of flexible hoses have had various uses, being employed, for example, for the cleaning of swimming pools; for air vacuum cleaners; and for other duct applications.

The flexible hoses known in the prior art have, however, presented a number of disadvantages. Such hoses which are predominantly of metal construction are unduly heavy. As a consequence, they are difficult to handle, and will sink when placed in water, such as when used for the cleaning of swimming pools. Furthermore, such metal hoses often do not provide sufficient elasticity and flexibility, and when bent may too readily go past the yield point (i.e., the metal will not return to its original shape). In the case of known hoses of predominantly plastic construction, having helically wound cores, the adjacent turns of the helix usually merely lie in abutment with one another. In addition, the cores may often include plies (loose or cemented together) to provide additional core matter. As a result, the cores themselves have little tensile strength, and have a tendency to separate if the usually associated outer wrap should split. Hoses having such types of plastic cores also may fail to provide a sufficiently high degree of flexibility. Upon bending of the hose, inner slippage of the core elements may take place, and rupture, kinking or displacement of the core elements may result. Furthermore, the known plastic hoses rarely provide a sufficiently high resistance to crush or to compressive loads without losing considerable flexibility. Nor do they exhibit sufficient ability to resist internal stresses without dislocation of the core elements. As a result, hoses of this type are not usually satisfactory for use where positive internal pressures are encountered, although sometimes usable where internal vacuums are present. As an additional disadvantage, the known hoses, whether of metal or plastic, usually have rough interior and exterior surfaces, in most instances due to the helical construction employed.

It is therefore an object of the present invention to provide an improved flexible hose of interlocking helical convolutions.

Another object of the invention is to provide an improved hose of interlocking helical convolutions produced from elastomeric material.

Another object of the present invention is to provide a helical-type hose of elastomeric material having high body strength coupled with a low weight, due to its novel construction.

Another object of the invention is to provide a helical-type hose of elastomeric material, which has an unusually high degree of flexibility.

Another object of the invention is to provide a helical-type hose of elastomeric material which exhibits a high degree of crush resistance.

Another object of the invention is to provide a helical-type hose of elastomeric material which is limited in axial contraction.

Another object of the invention is to provide a helical-type hose of relatively thin elastomeric material, but which exhibits a high hose wall section modulus.

Another object of the present invention is to provide a flexible hose of interlocking helical convolutions and having each convolution sealed to an adjacent convolution to prevent slippage therebetween and possible leakage from the hose.

Another object of the invention is to provide a flexible hose of interlocking helical convolutions having a substantially smooth interior and/or exterior hose surface.

Another object of the invention is to provide a helical-type hose of elastomeric material which will not unwind when the end thereof is cut.

Another object of the present invention is to provide a helical-type hose of elastomeric material, having a wall shaped to provide novel beam or ribbing effects for the attaining of improved flexibility.

Another object of the present invention is to provide a flexible hose of interlocking helical convolutions which is unusually well-adapted for use as a swimming pool hose.

These and other objects of the invention will become apparent from the following description thereof, read in conjunction with the accompanying drawings, in which:

FIG. 1 is a side elevation of a hose having a smooth interior surface, constructed in accordance with the invention, being partly in section;

FIG. 2 is an enlarged fragmentary section of the wall of the hose of FIG. 1;

FIG. 3 is a section taken longitudinally of a portion of the hose of FIGS. 1 and 2, illustrating the conformation thereof when in flexure;

FIG. 4 is a view similar to FIG. 2, the hose wall, however, being shown under tension;

FIG. 5 is a view similar to FIG. 2, but illustrating a modification of the hose of FIGS. 1–4;

FIG. 6 is a section taken longitudinally of a hose similar to that of FIGS. 1–4, but having a smooth exterior surface;

FIG. 10 is a section taken longitudinally of a hose having both a smooth interior and exterior surface, constructed in accordance with the invention;

FIG. 11 is an enlarged fragmentary section of the wall of the hose of FIG. 10;

FIG. 12 is a section taken longitudinally of a portion of the hose of FIGS. 10 and 11, illustrating the conformation of the latter when in flexure;

FIG. 13 is a view similar to FIG. 11, but illustrating the conformation of the hose wall when under tension;

FIG. 14 is a section, taken longitudinally of a hose similar in structure to the hose of FIGS. 10–13, but having the wall elements thereof in a reversed position;

FIG. 15 is a section taken longitudinally of another form of hose in accordance with the invention, and having both a smooth interior and exterior surface;

FIG. 16 is an enlarged fragmentary section of a wall portion of the hose of FIG. 15;

FIG. 17 is a section taken longitudinally of a portion of the hose of FIGS. 15 and 16, illustrating the conformation thereof when in flexure; and FIG. 18 is a view similar to FIG. 16, the hose being shown in tension.

Figure 7:
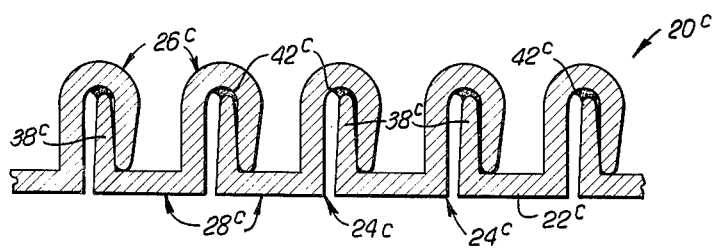
FIG. 7 is a view similar to FIG. 2, showing another modified form of the hose of FIGS. 1–4.

Referring to the drawings, and particularly to FIG. 1, a flexible hose 20 constructed in accordance with the invention and being in a position of repose is shown. The hose 20 comprises a strip 22 of elastomeric material, said strip 22 being in helical form and having a plurality of adjacently-positioned convolutions 24. As more clearly seen in FIG. 2, the strip 22 provides in cross section two oppositely-directed hook-shaped portions 26 and 28. The hook-shaped second portion 26 is rounded, including an inner flexible leg 30 and a radially-extending distal end leg 32 each extending substantially radially with respect to the axis of the hose 20; a rounded web section 33 between the said legs 30 and 32; and an inwardly-opening recess 34. A bonding face is located on one side of leg 32 and disposed within recess 34. The hook-shaped first portion 28 includes a base planar leg 36 extending axially from, and forming at an edge thereof a substantially square flexible corner 37 with, the leg 30. The leg 36 merges at another edge thereof with a single radially-outwardly-directed flexible leg 38, and forms a substantially square flexible corner 39 with the latter. The hook-shaped portion 28 and the leg 38 define an outwardly-opening recess 40. Another bonding face is located on one side of leg 38 and disposed within the inside of recess 40. Legs 30, 32 and 38 are substantially of equal lengths. Leg 32 and web section 33 constitute a hook-shaped sequence of elements extending from the distal end of inner leg 30 and forming a flexible hinge. The leg 38 of each convolution 24 is received within the recess 34 of the next adjacent convolution 24, while the leg 32 of the latter convolution is received within the recess 40 of the former convolution. Each pair of adjacent convolutions 24 are thus in interlocking engagement.

Within the recess 34 is a bead 42, located between the leg 32 and the associated leg 38. The bead or bond 42 is of elastomeric material, preferably of the same composition as the strip 22, and serves to seal, bond and affix together each pair of adjacent convolutions 24.

The strip 22 may be produced by means of conventional plastic extrusion or strip-forming apparatus or modifications thereof. Modified forms of apparatus known in the hose-forming, coil-forming and extrusion arts may be utilized to wind the strip 22 into the helical form desired, and to interlock the adjacent convolutions 24. Any conventional elastomeric material may be employed, such as, for example, one or a combination of the following types: polyethylene, polymerized vinyl, Teflon (trademark of E. I. du Pont de Nemours and Co.), polyvinyl chloride, rubber, neorene, buna S, and polypropylene. The bead or bond 42 may likewise be extruded by conventional apparatus, or by specially designed apparatus, and injected while molten at the appropriate point within the recess 34, during the winding of the strip 22 into helical form. The molten bead 42 will then continuously seal, bond and affix the legs 32 and 38 together.

When the hose 20 is flexed, it will assume a configuration such as shown at 20′ in FIG. 3. In the case of the flexed hose 20′, each convolution 24′ is at the outside 43 of the bend placed under tension; and at the inside 44 of the bend placed under compression. With respect to the outside 43 of the bend under tension, and as seen more clearly in FIG. 4, flexible legs 30′, 36′ and 38′ are spread apart as a result of the tension; said legs 30′, 36′ and 38′ (the latter leg acting in conjunction with the leg 32′ as a segment) are also bowed; the second and first corners 37′ and 39′ are bent open at the second and first edges of base planar leg 28′; and the rounded hook-shaped portion 26′ is also bent open. At the compression side 44′, bowing of the legs 30′, 36′, 38′ and 32′ likewise takes place, but to a lesser degree and in a reverse direction, as compared to the tension side. The corners 37′ and 39′ and the rounded hook-shaped portion 26′ at the compression side 44 remain substantially in their original position, but somewhat bent closed.

It will thus be apparent that the hose 20 provides an unusual degree of flexibility, due to the presence of three bow planes as provided by the legs 30, 36 and 38; and of the two corners 37 and 39, and the rounded portion 26, which are bendable (i.e., openable or closable). Such flexibility gained as a result of the shape of the strip 22 is, of course, in addition to the inherent flexibility of the elastomeric material employed. In spite of the high degree of flexibility attained, the convolutions 24 remain interlocked, and sealed, bonded and affixed together, as a result of the presence of the bead or bond 42. When the hose 20′ is released from flexure, it will readily return to its position of repose of FIGS. 1 and 2, since there has been no stretching of the elastomeric material beyond its ultimate yield point, and since the convolutions 24 are sealed, bonded and affixed together by means of the bead or bond 42.

The hose 20 when constructed of elastomeric material of the type mentioned above, and which has a good plastic memory, will tend to recover its shape even after severe and irregular deformation.

As a result of the beam, or ribbing, effect provided by the shape of the elastomeric strip 22, the hose 20 provides a relatively high hose wall section modulus, despite the comparatively slight thickness of the elastomeric material employed. Consequently, the hose 20 will not easily collapse, and an unusually high degree of crush resistance is attained.

As a further advantage of the shape of the strip 22, and due to the proportioning thereof, a substantially smooth interior surface 45 is provided for the hose 20. Such a smooth inner surface permits relatively uninhibited flow of fluids or gases passing through the hose, without the creation of turbulence.

A still further advantage of the shape configuration of the hose 20 is that unwinding of the latter will not take place when the end thereof is cut, due to the interlocking engagement between the adjacent convolutions 24, and the welding together thereof by the bead or bond 42.

As has been mentioned above, the elastomeric bead 42 aids in preventing the convolutions 24 of the hose 20 from separating, and also serves to aid return of the hose 20 to a position of repose after it has been bent. In addition, the bead 42 provides a solid bonded seal for the hose 20, rather than merely a loose unbonded seal or packing between the hose wall elements. Such seal provided by the bead 42 renders the hose 20 fluid tight.

Referring to FIG. 5, a modified form of the invention is shown. Here, a hose 20a similar in structure to the hose 20 of FIGS. 1–4 is provided, including a core 46, identical in structure to the hose 20, and an outer surrounding wrap 47. The outer wrap 47 may be of any of the above-mentioned types of elastomeric materials employed for the hose 20a itself (e.g., polyethylene). The outer wrap 47 completely surrounds the core 46, and may be pulled down tightly during fabrication of the latter around the outwardly-facing curved surface 48 presented by the rounded hook-shaped portion 26a of each convolution 24a. The outer wrap 47 may be made up of several plies of elastomeric material if desired. The outer wrap 47 provides an abrasion-resistant outer surface for the hose 20a. In addition, it provides added reinforcement of the convolutions 24a.

Referring to FIG. 6, a further modification of the hose structure of FIGS. 1–4 is shown. Here, a flexible hose 20b is provided, constructed from a strip 22b of elastomeric material, identical in shape to the strip 22 of the hose 20 of FIGS. 1–4. Thus, the strip 22b is in helical form and provides a plurality of adjacently-positioned interlocking convolutions 24b; and in cross-section includes a rounded hook-shaped portion 26b and a square-cornered, hook-shaped portion 28b. However, during formation of the hose 20b, the convolutions 24b are interlocked in such a manner that the rounded hook-shaped portion 26b of each convolution 24b lies at the inner surface of the hose 20b, while a smooth outer hose surface 45b is formed.

The hook-shaped portions 26b and 28b are sealed, bonded and affixed together by an elastomeric bead or bond 42b, as in the case of the hose 20; and the hose 20b is likewise in every other respect, apart from the aforementioned reversal of positioning of the elements thereof, identical in structure to the hose 20. The hose 20b also provides the above-discussed advantages in use of the hose 20; except that it is utilized where a smooth outer, rather than inner, hose surface is desired.

Referring to FIG. 7, a portion of a hose 20c, representing another modification of the hose of FIGS. 1–4 is shown. The hose 20c is formed from a strip 22c of elastomeric material identical in shape to the strip 22; and having interlocking helical convolutions 24c. Thus, at each convolution 24c a rounded hook-shaped portion 26c interlocks with a square-cornered hook-shaped portion 28c of the next adjacent convolution. The interlockng portions 26c and 28c are sealed, bonded and affixed together by an elastomeric head or bond 42c identical with the elastomeric bead 42 of FIGS. 1–4. However, the bead 42c is located at the distal end of the radially-outwardly-directed leg 38c of the square-cornered hook-shaped portion 28c. The positioning of the bead 42c at the distal end of the leg 38c, rather than adjacent said end (as in the hoses of FIGS. 1–6) results in a change in the stiffness effects attained in the hose.

It will be realized that the bead 42c may be located at some other point than shown, around the mating areas of the interlocked hose portions 26c and 28c, depending upon the stiffness effects desired.

The hose 20c generally provides the same advantages in use as discussed above in connection with the hose 20 of FIGS. 1–4.

Figure 8:
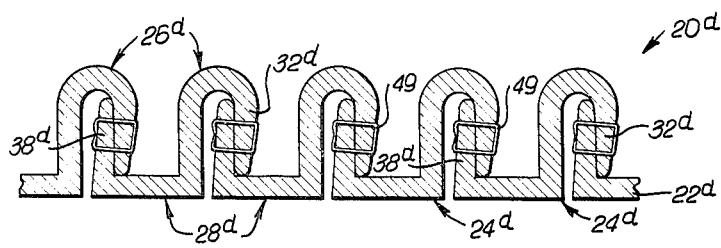
FIG. 8 is a view similar to FIG. 2, illustrating a further modification of the hose of FIGS. 1–4.

Referring to FIG. 8, a still further modification of the hose structure of FIGS. 1–4 is shown. Here, a wall portion of a hose 20d is illustrated, the latter being formed from a strip 22d identical to the strip 22 of the hose 20 of FIGS. 1–4, and providing adjacent interlocking convolutions 24d. A rounded hook-shaped portion 26d engages at each convolution 24d with a square-cornered hook-shaped portion 28d of the next adjacent convolution 24d. However, the leg 38d of the portion 28d is sealed, bonded or affixed at each convolution 24d to the adjacent leg 32d by means of a plurality of staples or bonds 49 (only one of the latter being shown), spaced about the periphery of the hose 20d. Each staple 49, it will be noted, is placed in approximately the same relative position as the bead 42 of the hose 20 of FIGS. 1–4. The staples 49 may be so positioned by any suitable conventional apparatus.

As an alternative to stapling together of the convolutions 24d, the latter may be sewed together, employing conventional sewing apparatus modified for the purpose.

The hose 20d provides advantages in use of the same general type as described above in the case of the hose 20 of FIGS. 1–4.

Figure 9:
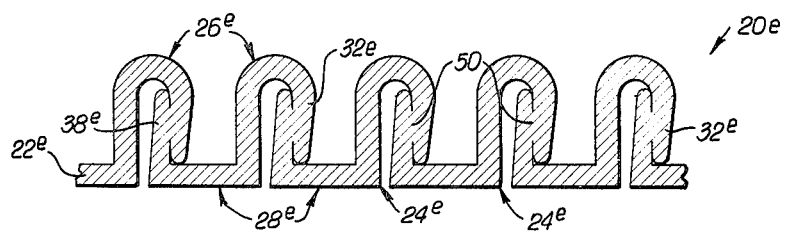
FIG. 9 is a view similar to FIG. 2, showing a still further modification of the hose of FIGS. 1–4.

Referring to FIG. 9, yet a further modification of the hose structure of FIGS. 1–4 is shown. Here, a wall portion of a hose 20e is shown, being formed from a strip 22e identical in shape to the strip 22, said strip 22e being in helical form and having a plurality of adjacently-positioned convolutions 24e. Each convolution 24e provides a rounded hook-shaped portion 26e, which is in interlocking engagement with a square-cornered hook-shaped portion 28e of the next adjacent convolution 24e. Here, however, the leg 38e of the portion 28e at each convolution 24e is sealed, bonded or affixed to the adjacent leg 32e by being partially melted together to form a bond and consequently made integral with the latter, as shown at 50. It will be noted that the point of melting together is preferably the same as that at which the bead 42 of FIGS. 1–4 is located.

The melting, bonding and affixing together may be effected by any suitable conventional apparatus, and the location thereof may be at other points than shown, around the mating surfaces of the convolutions 24e, depending upon the stiffness effects desired.

The hose 20e provides the same advantages in use as already discussed above, in connection with the hose 20 of FIGS. 1–4.

Referring to FIG. 10, an embodiment of the invention is shown, providing a hose 51 formed from a strip 52 of elastomeric material, the latter being of the same type as described above in the case of the hose 20 of FIGS. 1–4. The strip 52 is in helical form, and has a plurality of adjacently-positioned convolutions 54. The strip 52 provides in cross-section two oppositely-directed generally channel shaped flanges or hook-shaped portions 56 and 58, as most clearly seen in FIG. 11.

Second portion 56 includes a radially-extending inner leg 63 and a hook-shaped sequence of elements comprising an axially-extending intermediate planar leg 59 secured to inner leg 63, a radially-extending leg 60 secured to leg 59, and an axially-extending distal end leg 61. Legs 59, 60 and 61 are substantially straight when the hose 51 is in repose, and are then positioned substantially at right angles to one another, forming substantially square flexible hinges 62 therebetween.

First portion 58 includes an axially-extending planar leg 64 having a first edge and a single flexible radial leg 65 extending substantially at right angles to leg 64 at the first edge to form a first flexible corner 66. Leg 64 has a second edge at which inner leg 63 is secured to form a second flexible corner 66. Legs 60, 63 and 65 have substantially equal lengths and are aligned in a side-by-side arrangement at each adjacent one of convolutions 54. Inner leg 63 is joined to intermediate leg 59 to form a flexible hinge 67 and leg 63 and the sequence of elements define a recess X. Opposed bonding faces are located on distal end leg 61 on the outside of recess X and on planar leg 64.

The hook-shaped portion 56 at each convolution 54 interlocks with the hook-shaped portion 58 of the next adjacent convolution 54 within the recess X. As seen in FIG. 11, each leg 61 lies closely adjacent to leg 64 on the adjacent turn of the strip. A sealing bead or bond 68, which may be of elastomeric material, is bonded, secured, and affixed to the opposed bonding faces of legs 61 and 64 to form a segment and to maintain the faces in an opposed relationship. Thus, the adjacent helical turns are held together to provide a unitary fluid tight hose.

It will be noted that the strip 52 is so proportioned, that the axially-extending leg 59 at each convolution 54 provides a substantially smooth outer surface 69 for the hose 51. It will be further noted that the axially-extending leg 64 at each convolution 54 provides a substantially smooth inner surface 70 for the hose 51.

Since the strips are formed from elastomeric material, the opposite ends of leg 63 are flexibly connected to the ends of legs 59 and 64 defining flexible corner 66 and flexible hinge 67, respectively, which, along with the remainder of the portions as shown in FIG. 13, impart flexibility to the hose.

More particularly referring to FIG. 12, a portion of the hose 51 is shown in a position of flexure. Thus, the hose 51 at the outside of the bend is under tension as shown at 71, while at the inside of the bend it is under compression as shown at 72. As more clearly seen in FIG. 13, the portion 71 of the hose 51 under tension provides at each convolution 54, four bow planes, as represented by the bowed legs 59', 60', 63' and 64' (the leg 64' acting in conjunction with the leg 61'). Four squared connections which may bend are also provided at each convolution 54', including hinges 62' and 67' and corner 66'. As a result of the comparatively large number of bow planes and bendable corners and hinges, an unusually high degree of flexibility in the hose wall portion 71 is attained. A high degree of flexibility is likewise attained at the hose wall portion 72 under compression, also due to the large number of bow planes and bendable corners and hinges.

The hose 51 offers the numerous advantages discussed above in connection with the hose 20 of FIGS. 1–4, and in addition provides the smooth exterior hose surface 69, as well as the smooth interior hose surface 70.

Referring to FIG. 14, a portion of a hose 51a is shown, being a modification of the hose 51 of FIGS. 10–13. The hose 51a is formed from an elastomeric strip 52a identical with the strip 52, and the said strip 52a is in helical form, providing a plurality of adjacently-positioned convolutions 54a. However, the hook-shaped second and first portions 56a and 58a are reversely positioned as compared to the corresponding portions 56 and 58 of the hose 51, so that the bead 68a lies adjacent the smooth outer hose surface 69a. The hose 51a likewise has a smooth inner surface 70a. The hose 51a offers advantages in use similar to thoes already discussed with respect to the hose 51.

Referring to FIG. 15, another embodiment of the invention is shown, being in the form of a flexible hose 74 formed from a strip of elastomeric material 76 having a composition of the same type as described in connection with the strip 22 of the hose 20 of FIGS. 1–4. Said strip 76 is in helical form, and has a plurality of adjacently-positioned convolutions 78. As seen more clearly in FIG. 16, the strip 76 provides in cross-section two oppositely-directed hook-shaped first and second portions 80 and 82 respectively. An inner flexible leg 84 of second portion 82 extends substantially radially of the hose 74 when the latter is in a position of repose. When the hose 74 is in such a position of repose, each hook-shaped portion 80 provides a flexible axially-extending planar leg 86, having opposed first and second edges and a flat surface extending therebetween, a flexible radial leg 88 extending substantially at right angles to planar leg 86 at the first edge thereof, and an axially-extending distal end leg 90. Legs 86, 88 and 90 define a recess 92 within the hook-shaped portion 80. The hook-shaped portion 80 also provides three flexible square corners, as shown at 93. The hook-shaped portion 82 is similar in shape to the hook-shaped portion 80, and comprises inner leg 84 and a hook-shaped sequence of elements comprising an axially-extending intermediate planar leg 94 secured to inner leg 84, a radially-extending leg 96 secured to leg 94, and an axially-extending distal end leg 98 secured to leg 96 corresponding respectively to the legs 86, 88 and 90. The portion 82 also provides a recess 100 corresponding to the recess 92, and three square flexible hinges 102, corresponding respectively to the corners 93. Bonding faces are located within the recesses on legs 90 and 98. The leg 90 at each convolution 78 is received within the recess 100 of the next adjacent convolution 78, while the leg 98 of the latter convolution 78 is received within the recess 92 of the former convolution 78. A tight interlocking engagement between the adjacent convolution 78 is thus obtained.

An elastomeric bead or bond 104 which may be of the same composition as the bead 42 of the hose 20 of FIGS. 1–4, serves to seal, bond and affix the leg 90 of each convolution 78 to the leg 98 of the adjacent interlocked convolution 78.

The strip 76 is so proportioned, that the leg 94 provides a smooth outer surface 106 for the hose 74, while the leg 86 provides a smooth inner surface 108 for said hose 74.

Referring to FIG. 17, the hose 74 is shown in a posi- of flexure, being under tension at the outside 110 of the bend; and under compression at the inside 112 of the bend. As seen more clearly in FIG. 18, bending at the tension side 110 occurs at six bow planes, as represented by the bowed legs 84', 86', 88', 94', and 96', and portions of the bowed legs 90' and 98' acting together as a segment. Also, three bendable corners 93', as well as three bendable hinges 102' are provided for each convolution 78'.

The hose 74 may be produced in the same manner, and provides the same advantages in operation as discussed in connection with the hose 20 of FIGS. 1–4. However, the hose 74, of course, has the additional advantage of providing a smooth exterior hose surface 106 as well as a smooth interior hose surface 108.

It is apparent that the flexibility of the embodiments shown in FIGS. 10–18 is to a large extent determined by the shape of the first and second portions. The corners and the hinges serve to provide the flexibility as described above.

It should be realized that any of the hoses of FIGS. 1–18 may be of any convenient size, as long as the dimensions of the elements thereof are such as to provide the desired configuration. Furthermore, hoses of similar construction may be provided in accordance with the invention, having more or less bow planes and openable and closable corners and hinges, than here specifically shown, for purposes of more or less flexibility. Also, any of the hoses of the invention may have an outer wrap as shown in FIG. 5; or may have the convolutions thereof sealed, bonded and affixed together in the manner shown in the modified form of FIG. 7. In addition, where access to the hose wall elements is obtainable, any of the hoses may have the convolutions stapled or melted together in the manner shown in FIGS. 8 and 9.

Although the invention has been described with reference to particular embodiments thereof, it should be realized that various changes and modifications may be made therein without departing from the spirit of the invention or the scope of the appended claims.

I claim:

1. A flexible elastomeric hose of wound interengaging helical convolutions having an axis and comprising:
   an extruded continuous strip of flexible elastomeric thermoplastic material helically wound to form the convolutions and comprising in cross section a first portion and a second portion;
   said first portion including
       a flexible base planar leg extending parallel to the axis of the hose and having first and second edges at opposed ends thereof and exterior and interior surfaces,
       a single flexible leg secured substantially at right angles to said base planar leg at said first edge and extending away from the axis to form a first flexible corner and
       a first bonding face on one side of said single leg and disposed within the inside of said first corner;
   said second portion including
       an inner flexible leg secured substantially at right angles to said base planar leg at said second edge and extending away from the axis to form a second flexible corner,
       a flexible rounded web section secured to said inner leg to form a flexible hinge,
       a radially-extending flexible distal end leg secured to said rounded web section and extending toward the axis substantially at right angles thereto,
       said inner leg, said rounded web section and said radially-extending distal end leg forming a recess opening toward the axis, and
       a second bonding face on one side of said radially-extending distal end leg and disposed within the inside of the recess;

said single leg, said inner leg and said radially-extending distal end leg having substantially equal lengths and aligned in a side-by-side arrangement at each adjacent one of said convolutions wherein said single leg projects within the recess of an adjacent convolution; and a bond consisting only of a continuous bead of elastomeric thermoplastic material compatible with the elastomeric material of which said strip is formed continuously affixing, securing, bonding and sealing said single leg and said radially-extending distal end leg together only at said first and second bonding faces to form a flexible segment to dispose and maintain said first and second bonding faces in opposed relationship within the recess to provide a fluid-tight resilient joint, to permit independent flexure of said inner leg, said base planar leg and said rounded web section with respect to said segment, to afford flexure of at least the apexes of said first and second corners, said hinge, said base planar leg and said segment to maintain the flexibility of the hose, to minimize stresses acting on said bond, to maintain the arrangement for reinforcing the hose against radially directed deformamation forces, and to effect and maintain an abutment of said first and second edges at adjacent convolutions, the abutment effecting a substantially continuous smooth interior hose surface from said base planar leg interior surfaces and limiting axial hose contraction.

2. A flexible longitudinally extending elastomeric hose of helical convolutions, comprising a strip of flexible elastomeric material helically wound to form the convolutions of said hose, said strip comprising in cross section a first portion and a second portion;

said first portion including a flexible axially-extending planar leg having first and second longitudinally spaced edges and a flat surface extending between said edges, a component comprising at least a single flexible radial leg extending substantially at right angles to said planar leg at said first edge to form at least a first flexible corner and to form a recess, and a first bonding face located on said first portion only and disposed within the recess;

said second portion including an inner flexible leg extending substantially at right angles from said planar leg in the same direction as said single radial leg of said first portion at said second edge to form a second flexible corner and a hook-shaped sequence of flexible element extending from the distal end of said inner leg and forming at least one flexible hinge, said sequence comprising at least one further component comprising at least one radially-extending leg extending substantially at right angles to said planar leg in a direction opposite to said inner leg and a second bonding face on one of said elements and independent of said inner leg;

said single radial leg, said inner leg and said radially-extending leg having substantially equal lengths and being aligned in a side-by-side arrangement at each adjacent helical convolution; and a bond independent of said inner radial leg and affixing, securing and sealing only said first and second bonding faces together to form a thickened segment, said bond maintaining said first and second bonding faces in opposed relationship, said bond providing a fluid tight joint, the location of said bond permititng independent flexure of at least said inner leg with respect to said segment, allowing flexure of at least one other of of said legs and said elements, affording flexure of at least the apexes of said corners and said hinge for maintaining the flexibility of the hose, minimizing stresses acting on said bond, maintaining the arrangement of said radially directed legs for reinforcing the hose against deformation forces, and maintaining an abutment of said first and second edges respectively at adjacent convolutions, the abutment effecting a substantially smooth hose surface from said planar leg surfaces and limiting hose contraction.

3. A flexible elastomeric hose as in claim 2 wherein said first bonding face is on said single flexible radial leg;

said hook-shaped sequence of flexible elements further comprises a rounded web section secured to said inner flexible leg and said radially-extending leg to form said one flexible hinge, said inner leg, said rounded web section and said radially-extending leg forming a second recess, and said second bonding face being located on one side of said radially-extending leg and disposed within the second recess; and said bond affixes, secures and seals said single radial leg and said radially-extending leg only at said bonding faces and disposes and maintains said single radial leg within the second recess.

4. A flexible elastomeric hose as in claim 2 wherein said first bonding face is on said flexible axially-extending planar leg of said first portion;

said hook-shaped sequence of flexible elements of said second portion further comprises an axially-extending intermediate planar leg extending from said inner leg to form said one flexible hinge and extending from said radially-extending leg to form a second flexible hinge and an axially-extending distal end leg secured to said radially-extending leg to form a third flexible hinge, said inner leg, said axially-extending intermediate planar leg, said radially-extending leg and said axially-extending distal end leg forming a second recess and said second bonding face being located on one side of said axially-extending distal end leg and disposed outside of the second recess; and said bond affixes, secures and seals said axially-extending planar leg of said first portion and said axially-extending distal end leg together only at said bonding faces.

5. A flexible elastomeric hose as in claim 2 wherein said first portion further comprises a first flexible axially-extending distal end leg extending substantially at right angles to said single flexible radial leg to form a third flexible corner, said flexible axially-extending planar leg of said first portion, said single leg and said axially-extending distal end leg forming the recess and said first bonding face being located on said axially-extending distal end leg;

said hook-shaped sequence of flexible elements of said second portion further comprises
- an axially-extending intermediate planar leg extending from said inner leg to form said one flexible hinge and extending from said radially-extending leg to form a second flexible hinge and
- a second axially-extending distal end leg extending from said radially-extending leg to form a third flexible hinge, said inner leg, said axially-extending intermediate planar leg, said radially-extending leg and said second axially-extending distal end leg forming a second recess and said second bonding face being located on one side of said second axially-extending distal end leg and disposed within the inside of the second recess; and said bond affixes, secures and seals said first and second axially-extending distal end legs together only at said bonding faces.

References Cited by the Examiner

UNITED STATES PATENTS

| | | | |
|---|---|---|---|
| 805,825 | 11/1905 | Sussman et al. | 138—136 |
| 1,593,016 | 7/1926 | Campbell | 128—135 X |
| 1,819,175 | 8/1931 | James | 138—129 X |
| 1,923,693 | 8/1933 | Stone | 138—122 |
| 2,045,540 | 6/1936 | Debenedetti. | |
| 2,073,335 | 3/1937 | Connell | 138—122 |
| 2,354,485 | 7/1944 | Slaughter | 138—129 X |
| 2,739,089 | 3/1956 | Hageltorn | 138—122 |

FOREIGN PATENTS

| | | |
|---|---|---|
| 387,823 | 7/1908 | France. |
| 1,206,368 | 8/1959 | France. |
| 11,033 | 1892 | Great Britain. |
| 553,308 | 5/1943 | Great Britain. |
| 789,521 | 1/1958 | Great Britain. |
| 819,546 | 9/1959 | Great Britain. |

LAVERNE D. GEIGER, *Primary Examiner.*

EDWARD V. BENHAM, *Examiner.*

L. FOSTER, C. HOUCK, *Assistant Examiners.*

UNITED STATES PATENT OFFICE
CERTIFICATE OF CORRECTION

Patent No. 3,255,780                              June 14, 1966

Billie Lee Squirrell

It is hereby certified that error appears in the above numbered patent requiring correction and that the said Letters Patent should read as corrected below.

Column 1, lines 11 and 12, for "November 11, 1960" read -- November 16, 1960 --; column 9, line 60, for "element" read -- elements --.

Signed and sealed this 22nd day of August 1967.

(SEAL)
Attest:

ERNEST W. SWIDER                              EDWARD J. BRENNER
Attesting Officer                                  Commissioner of Patents